(12) United States Patent
Wang et al.

(10) Patent No.: US 12,027,695 B2
(45) Date of Patent: Jul. 2, 2024

(54) SECONDARY BATTERY, PROCESS FOR PREPARING THE SAME AND APPARATUS CONTAINING THE SECONDARY BATTERY

(71) Applicant: Contemporary Amperex Technology Co., Limited, Ningde (CN)

(72) Inventors: Jiazheng Wang, Ningde (CN); Meng Kang, Ningde (CN); Xiaobin Dong, Ningde (CN); Yuliang Shen, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 69 days.

(21) Appl. No.: 17/566,713

(22) Filed: Dec. 31, 2021

(65) Prior Publication Data
US 2022/0123287 A1 Apr. 21, 2022

Related U.S. Application Data

(63) Continuation of application No. PCT/CN2020/088301, filed on Apr. 30, 2020.

(51) Int. Cl.
*H01M 4/36* (2006.01)
*H01M 4/133* (2010.01)
(Continued)

(52) U.S. Cl.
CPC ........... *H01M 4/366* (2013.01); *H01M 4/133* (2013.01); *H01M 4/1393* (2013.01);
(Continued)

(58) Field of Classification Search
None
See application file for complete search history.

(56) References Cited

U.S. PATENT DOCUMENTS

| | | |
|---|---|---|
| 2016/0276657 A1 | 9/2016 | Song et al. |
| 2018/0190985 A1 | 7/2018 | Choi et al. |

(Continued)

FOREIGN PATENT DOCUMENTS

| | | |
|---|---|---|
| CN | 104810508 A | 7/2015 |
| CN | 106058154 A | 10/2016 |

(Continued)

OTHER PUBLICATIONS

The extended European search report for European Application No. 20933502.5, dated Jun. 10, 2022, 5 pages.
(Continued)

*Primary Examiner* — Wyatt P McConnell
(74) *Attorney, Agent, or Firm* — East IP P.C.

(57) ABSTRACT

The present application relates to a secondary battery, a process for preparing the same and an apparatus containing the secondary battery. In particular, the secondary battery comprises a negative electrode plate, and the negative electrode plate comprises a negative current collector and a negative electrode film, wherein the negative electrode film comprises a first negative electrode film and a second negative electrode film, the first negative electrode film is disposed on at least one surface of the negative current collector and comprises a first negative electrode active material, the first negative electrode active material comprises graphite; the second negative electrode film is disposed on the first negative electrode film and comprises a second negative electrode active material, the second negative electrode active material comprises artificial graphite, and the second negative electrode active material comprises secondary particles, the number percentage of which is greater than or equal to 20%.

19 Claims, 4 Drawing Sheets

(51) Int. Cl.
  *H01M 4/1393* (2010.01)
  *H01M 4/587* (2010.01)
  *H01M 4/02* (2006.01)

(52) U.S. Cl.
  CPC ...... *H01M 4/587* (2013.01); *H01M 2004/021* (2013.01); *H01M 2004/027* (2013.01); *H01M 2220/20* (2013.01)

(56) References Cited

U.S. PATENT DOCUMENTS

| | | | | |
|---|---|---|---|---|
| 2019/0305308 | A1* | 10/2019 | Lee | H01M 4/133 |
| 2021/0143425 | A1* | 5/2021 | An | H01M 4/587 |

FOREIGN PATENT DOCUMENTS

| | | | |
|---|---|---|---|
| CN | 107785535 | A | 3/2018 |
| CN | 107871854 | A | 4/2018 |
| CN | 108701816 | A | 10/2018 |
| CN | 108807848 | A | 11/2018 |
| CN | 108807849 | A | 11/2018 |
| CN | 109286020 | A | 1/2019 |
| CN | 110148708 | A | 8/2019 |
| CN | 110660965 | A | 1/2020 |
| CN | 111082129 | A | 4/2020 |
| JP | 2007035589 | A | 2/2007 |
| JP | 2008186732 | A | 8/2008 |
| JP | 2018530873 | A | 10/2018 |
| JP | 2019508839 | A | 3/2019 |
| JP | 2019164967 | A | 9/2019 |
| JP | 2020013754 | A | 1/2020 |
| KR | 1020140095980 | A | 8/2014 |
| KR | 1020180035693 | A | 4/2018 |
| KR | 1020190121068 | A | 10/2019 |
| KR | 1020200038168 | A | 4/2020 |
| WO | 2019054811 | A1 | 3/2019 |

OTHER PUBLICATIONS

The First Office Action for Chinese Application No. 202080006126.3, dated Sep. 28, 2022, 8 pages.
GB/T 5162-2006,Metallic powders—Determination of tap density, ISO 3953;1993, IDT, Jul. 18, 2006,8 pages.
GB/T 19077.1-2016, Particle size analysis—Laser diffraction methods, ISO 13320:2009,IDT, Feb. 24, 2016,51 pages.
JB/T 4220-2011,Determination method of artificial graphite lattice parameter, Dec. 20, 2011, 16 pages.
JIS K 0131-1996,General rules for X-ray diffracto metric analysis, 1996,30 pages.
JY/T010-1996, General rules for analytical scanning electron microscopy, Jan. 23, 1997,12 pages.
GB/T 24533-2009, Graphite negative electrode materials for lithium ion battery, Oct. 30, 2009, 61 pages.
The First Office Action for India Application No. 202227030289, dated Dec. 16, 2022, 5 pages.
The Rejection Decision for Chinese Application No. 202080006126.3, dated Dec. 5, 2022, 5 pages.
The International search report for PCT Application No. PCT/CN2020/088301, dated Feb. 7, 2021, 13 pages.
The Office Action for Korean Application No. 10-2022-7018612, dated Jun. 28, 2023, 17 pages.
The First Office Action for Japanese Application No. 2022-532654, dated May 29, 2023, 14 pages.
The Notice of the Grant for Chinese Application No. 202080006126.3, dated Sep. 24, 2023, 6 pages.

* cited by examiner

SECONDARY BATTERY, PROCESS FOR PREPARING THE SAME AND APPARATUS CONTAINING THE SECONDARY BATTERY

CROSS-REFERENCE TO RELATED APPLICATIONS

This application is a continuation of International Application No. PCT/CN2020/088301, entitled "Secondary Battery, Process for Preparing the Same and Apparatus Containing the Secondary Battery" and filed on Apr. 30, 2020, which is incorporated herein by reference in its entirety.

TECHNICAL FIELD

The present application belongs to the field of electrochemical technology and, more specifically, relates to a secondary battery, a process for preparing the same and an apparatuses containing the secondary battery.

BACKGROUND

As a new type of rechargeable battery with high voltage and high energy density, the secondary battery is widely used in the new energy industry due to its outstanding characteristics of light weight, high energy density, no pollution, no memory effect and long service life.

With the continuous development of new energy industry, people put forward higher requirements for secondary batteries. However, the increase of energy density of secondary battery often brings an adverse impact on the power performance and service life of the battery. Therefore, how to improve other electrochemical properties on the premise of high energy density is the key challenge in the field of battery design.

In view of this, it is necessary to provide a secondary battery which can solve the above problems.

SUMMARY

In view of the technical problems in the prior art, the present application provides a secondary battery and an apparatus including the same, which aims at achieving both good power performance (quick charging performance) and long cycle life while the secondary battery has a high energy density.

In order to achieve the above object, a first aspect of the present application provides a secondary battery, comprising a negative electrode plate, wherein the negative electrode plate comprises a negative electrode current collector and a negative electrode film, and the negative electrode film comprises a first negative electrode film and a second negative electrode film; the first negative electrode film is disposed on at least one surface of the negative electrode current collector and comprises a first negative electrode active material, and the first negative electrode active material comprises natural graphite ; and the second negative electrode film is disposed on the first negative electrode film and comprises a second negative electrode active material, and the second negative electrode active material comprises artificial graphite and comprises secondary particles, and the number percentage of secondary particles in the second negative electrode active material S2 is greater than or equal to 20%.

In a second aspect of the present application, a process method for preparing a secondary battery is provided, comprising preparing a negative electrode plate of the secondary battery by the following steps:

1) forming a first negative electrode film comprising a first negative electrode active material on at least one surface of a negative electrode current collector, wherein the first negative electrode active material comprises natural graphite; and
2) forming a second negative electrode film comprising a second negative electrode active material on the first negative electrode film, wherein the second negative electrode active material comprises artificial graphite; and the second negative electrode active material comprises secondary particles, and the number percentage of secondary particles in the second negative electrode active material S2 is greater than or equal to 20%.

In a third aspect of the present application, the present application also provides an apparatus comprising a secondary battery according to the first aspect of the present application or a secondary battery prepared according to the process of the second aspect of the present application.

Over existing technologies, the present application provides at least the following beneficial effects:

In the secondary battery according to the application, the negative electrode plate comprises a dual coating structure, and the first negative electrode film layer and the second negative electrode film layer contain specific negative electrode active materials, so that the secondary battery can have good quick charging performance and cycle performance on the premise of higher energy density. Preferably, the battery can also have better high-temperature storage performance. The device according to the present application includes the secondary battery, so it has at least the same advantages as the secondary battery.

Figure 1:
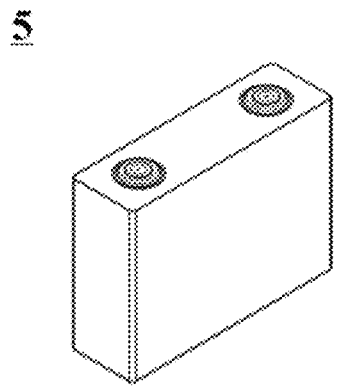
FIG. 1 shows a schematic diagram of an embodiment of a secondary battery in the present application.

The reference signs used the appended drawings are as follows:
1 Battery pack
2 Upper cabinet body
3 Lower cabinet body
4 Battery module
5 Secondary battery 51 House
52 Electrode assembly
53 Cover plate
10 Negative electrode plate
101 Negative electrode current collector
102 Second negative electrode film
103 First negative electrode film

DETAILED DESCRIPTION

The application is further described in combination with specific embodiment as follows. It should be understood that these specific embodiments are used only to describe the application without limitation to its scope.

For the sake of brevity, the present application explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. The recitation of "more" in the phrase "one or more" includes two or more.

Unless otherwise stated, the terms used in the present application have the common meaning known by technicians in this field. Unless otherwise stated, the values of the parameters mentioned in the present application may be measured by various methods commonly used in this field, by the methods below given in the examples of the present application, for example.

Secondary Battery

The application in a first aspect provides a secondary battery. The secondary battery comprises a positive electrode plate, a negative electrode plate and an electrolyte. During battery charging and discharging, active ions are intercalated and de-intercalated between positive and negative electrode plates. Electrolytes act as conducting ions between positive and negative electrode plates.

[Negative Electrode Plate]

In the secondary battery according to the application, the negative electrode plate in the secondary battery comprises a negative current collector and a negative electrode film, wherein the negative electrode film comprises a first negative electrode film and a second negative electrode film; the first negative electrode film is disposed on at least one surface of the negative current collector and comprises a first negative electrode active material, the first negative electrode active material comprises natural graphite; the second negative electrode film is disposed on the first negative electrode film and comprises a second negative electrode active material, the second negative electrode active material comprises artificial graphite and comprises secondary particles, and the number percentage of secondary particles in the second negative electrode active material S2 is greater than or equal to 20%.

Through research, the inventors have found that when the negative electrode plate of the secondary battery includes a dual coating film structure, and the upper and lower film layers include specific negative electrode active materials, the battery can have good quick charging performance and cycle performance at the same time. When the battery is charging, the closer it is to the separation membrane side along the thickness direction of the negative electrode plate, the higher the active ion concentration, and the closer it is to the current collector side, the smaller the active ion concentration. The second negative electrode film layer is closer to the separation membrane side, and the concentration of active ions in its area is higher. If the active material in the second negative electrode film layer contains a certain amount of secondary particles, the de-intercalation active ion channels it can provide will increase, so as to match the actual distribution of active ions in this area, thereby ensuring that the battery has excellent quick charging performance and cycle performance.

In the application, the range of S2 may be: 30%≤S2≤100%, 40%≤S2≤85%, 45%≤S2≤98%, 50%≤S2≤100%, 55%≤S2≤95%, 60%≤S2≤95%, 80%≤S2≤100%, 90%≤S2≤100% or the like.

In some preferred embodiments, the number percentage of secondary particles in the second negative electrode active material S2 is greater than or equal to 50%.

The inventors have further found that with the increase of the content of secondary particles, a larger number of new interfaces will be introduced to the negative electrode active material during the cold pressing of the electrode, which will increase the side reaction between the negative electrode active material and the electrolyte and affect the high-temperature storage performance of the battery to a certain extent. Therefore, in order to further balance the quick charging performance, cycle performance and high-temperature storage performance, in some embodiments, the range of S2 is 50%≤S2≤85%.

The inventors have conducted intensive studies to find that, on the basis that the negative electrode plate of the secondary battery according to the present application satisfies the foregoing requirements, the performance of the secondary battery can be further improved, in the event that it optionally satisfies one or more of the following requirements.

In some preferred embodiments, the first negative electrode active material includes primary particles, and the number percentage of primary particles in the first negative electrode active material S1 is greater than or equal to 80%; more preferably, 90%≤S1≤100%. The first negative electrode film layer is closer to the negative collector side, and the active ion concentration in its area is lower. Therefore, the first negative electrode active material preferably includes more primary particles so that the capacity of the battery is higher. At the same time, the increase of the proportion of primary particles can enhance the adhesion between the first negative electrode film and the current collector, so as to further improve the cycle performance of the battery.

In some preferred embodiments, the volume distribution particle size $D_v50$ of the first negative electrode active material is greater than the volume distribution particle size $D_v50$ of the second negative electrode active material. The inventors have found that when the volume distribution particle size $D_v50$ of the first negative electrode active material is greater than that of the second negative electrode active material, it is conducive to the pore structure optimization of the porous electrode, especially the second active layer, and further improve the quick charging performance of the battery. At the same time, the optimization of the pore structure is conducive to reducing the local polarization of the electrode, so as to further improve the cycle performance of the battery.

In some preferred embodiments, the volume distribution particle size $D_v50$ of the first negative electrode active material may be 11 μm to 20 μm, more preferably 13 μm to 20 μm.

In some preferred embodiments, the volume distribution particle size $D_v50$ of the second negative electrode active material may be 11 μm to 18 μm, more preferably 12 μm to 16 μm.

In some preferred embodiments, the ratio of the compacted density of the first negative electrode active material under 20,000N pressure to the compacted density of the second negative electrode active material under 20,000N pressure is ≥0.78, preferably from 0.84 to 0.98.

In some preferred embodiments, the compacted density of the first negative electrode active material under the pressure of 20,000N is 1.6 g/cm$^3$ to 1.88 g/cm$^3$, more preferably 1.70 g/cm$^3$ to 1.85 g/cm$^3$.

In some preferred embodiments, the compacted density of the second negative electrode active material under the pressure of 20,000N is 1.58 g/cm$^3$ to 1.82 g/cm$^3$, more preferably 1.64 g/cm$^3$ to 1.74 g/cm$^3$.

In some preferred embodiments, the volume distribution particle size $D_v10$ of the first negative electrode active material is 6 μm to 11 μ, more preferably 7 μm to8.

In some preferred embodiments, the volume distribution particle size $D_v99$ of the first negative electrode active material is 24 μto 38 μ, more preferably 30 μto 38 μm.

In some preferred embodiments, the particle size distribution, $(DV90-D_v10)/D_v50$, of the first negative electrode active material is 0.7 to 1.5, more preferably 0.9 to 1.3.

In some preferred embodiments, the graphitization degree of the first negative electrode active material is ≥95.5%, more preferably 96.5% to 98.5%.

In some preferred embodiments, the volume distribution particle size $D_v10$ of the second negative electrode active material is 6.2 μto 9.2 μ, more preferably 6.6 μto 8.8 μm.

In some preferred embodiments, the volume distribution particle size $D_v99$ of the second negative electrode active material is 29 μm to 43 μ, more preferably 37 μto 41 μm.

In some preferred embodiments, the particle size distribution, $(DV90-D_v10)/D_v50$, of the second negative electrode active material is 0.9 to 1.6, more preferably 1.1 to 1.4.

In some preferred embodiments, the graphitization degree of the second negative electrode active material is 92.5% to 96.5%, more preferably 93.1% to 95.1%.

In some preferred embodiments, the mass percentage of the natural graphite in the first negative electrode active material is ≥60%, more preferably, the mass percentage of the natural graphite in the first negative electrode active material is from 80% to 100%.

In some preferred embodiments, the mass percentage of the artificial graphite in the second negative electrode active material is ≥90%, more preferably, the mass percentage of the artificial graphite in the second negative electrode active material is from 95% to 100%.

In some preferred embodiments, the thickness of the negative electrode film is ≤60μm, and more preferably from 65 μm to 80 μm. It shall be noted that the thickness of the negative electrode film is the whole thicknesses of the first negative electrode film, i.e. the sum of the thicknesses of the first negative electrode film and the second negative electrode film.

In some preferred embodiments, the surface density of the negative electrode film is from 9 mg/cm$^2$ to 14 mg/cm$^2$, preferably from 11 mg/cm$^2$ to 13 mg/cm$^2$. It is necessary to note that the surface density of the negative electrode film refers to the surface density of the overall negative electrode film, i.e., the sum of the surface density of the first negative electrode film and that of the second negative electrode film.

In some preferred embodiments, the thickness ratio of the second negative electrode film to the first negative electrode film is from 0.7 to 1.2, preferably from 0.75 to 1.15. When the thickness ratio of the first and second negative electrode films is within the given range, it is beneficial to form a suitable gradient pore distribution in the upper and lower layers, which reduces the liquid phase conduction resistance of de-intercalated active ions from the positive electrode on the surface of the negative electrode film, and effectively reduces the probability of lithium precipitation caused by ion accumulation on the surface. Meanwhile, the uniform diffusion of active ions in the film is beneficial to reduce polarization, which can further improve the dynamic performance and cycle performance of the battery.

Figure 9:
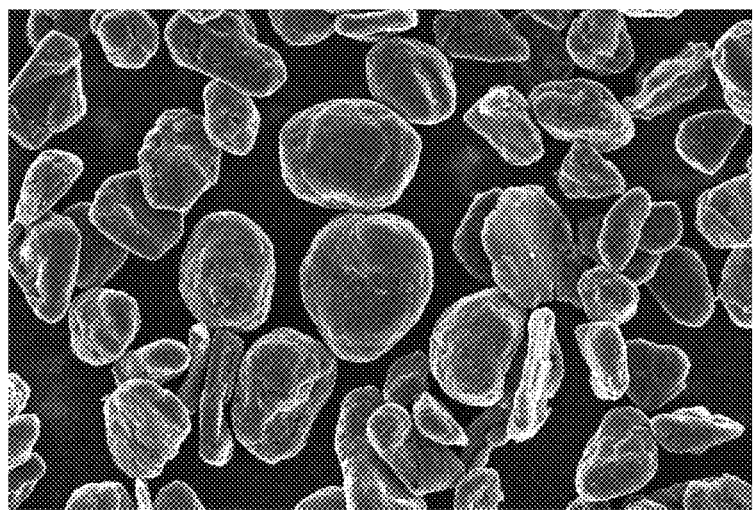
FIG. 9 shows a SEM image of the primary particles in an embodiment of a first negative electrode active material in the present application.
Figure 10:
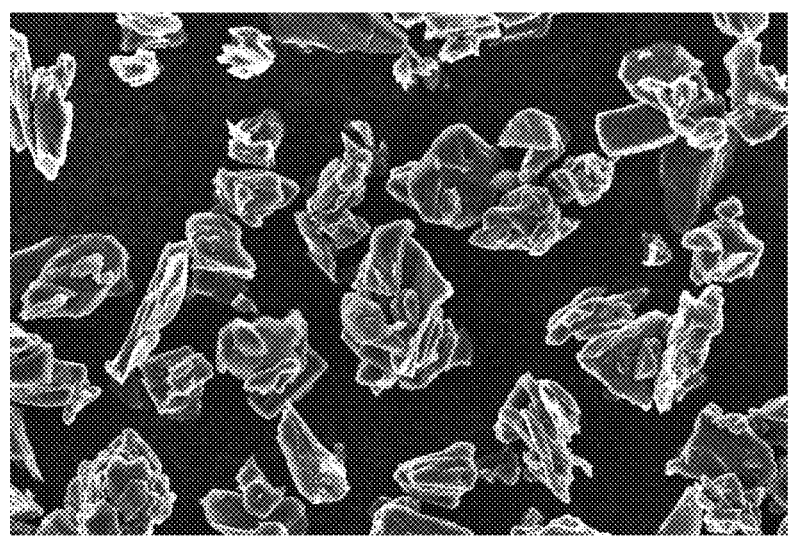
FIG. 10 shows a SEM image of the secondary particles in an embodiment of a second negative electrode active material in the present application.

In the present application, the terms "primary particles" and "secondary particles" have meanings well known in the art. Primary particles refer to particles without agglomeration, and secondary particles refer to particles in an agglomerated state formed by aggregating two or more primary particles. The primary and secondary particles can be easily distinguished by taking SEM images using a scanning electron microscope. For example, FIG. 9 shows a SEM image of primary particles in a typical first negative electrode active material, and FIG. 10 shows a SEM image of secondary particles in a typical second negative electrode active material.

The number percentage of the primary particles or secondary particles in a negative electrode active material can be measured by an apparatus and a method known in the art, e.g. by a scanning electron microscope. For example, the number percentage of the secondary particles in a negative electrode active material can be measured by laying and adhering a negative electrode active material on a conductive adhesive to prepare a sample to be tested with a long*width of 6 cm×1.1 cm; and testing the particle morphology using a scanning electron microscope (e.g. ZEISS Sigma 300). The test can be carried out with reference to JY/T010-1996. In order to ensure the accuracy of the test result, a plurality of (for example, 20) different areas can be randomly selected from the sample to be tested to perform the scan test, and under a certain magnification (for example, 1000 times), the percentage of the number of the secondary particles in each area being tested to the total number of the particles is calculated to give the number percentage of the secondary particles in the area; than the average value of the test results of the plurality of test areas is taken as the number percentage of the secondary particles in the negative electrode active material. The number percentage of the primary particles in the negative electrode active material can be measured similarly.

In the present application, $D_v10$, $D_v50$, $D_v90$, $D_v99$ of the negative electrode active material all have meanings known in the art and can be tested using methods known in the art. This can be directly measured, for example, by a laser diffraction particle size distribution tester (e.g., a Malvern Mastersizer 3000) with reference to e.g. the standard GB/T19077.1-2016. $D_v10$ refers to the corresponding particle size when the cumulative volume percentage of the negative electrode active material reaches 10%; $D_v50$ refers to the corresponding particle size when the cumulative volume percentage of the negative electrode active material reaches 50%; $D_v90$ refers to the corresponding particle size when the cumulative volume percentage of the negative electrode active material reaches 90%; and Dv99 refers to the corresponding particle size when the cumulative volume percentage of the negative electrode active material reaches 99%.

In the present application, the tap density of the negative electrode active material has a meaning well known in the art and can be tested using a method known in the art. For example, the test can be performed by using a powder tap density tester (such as the Dandong Baitt BT-301) with reference to the standard GB/T5162-2006.

In the present application, the graphitization degree of the negative electrode active material has a common meaning in this field and can be tested using methods already known in this field. For example the test could be performed using an X-ray diffractometer (e.g. Bruker D8 Discover). According to JIS K 0131-1996 and JB/T 4220-2011, the size of d002 can be measured, and then the graphitization degree can be calculated according to the formula $G=(0.344-d002)/(0.344-0.3354)\times100\%$, where d002 is the interlayer spacing of graphite crystal structure in nm. CuKa rays are used as a radiation source in an X-ray diffraction analysis test, with a radiation wavelength of $\lambda=1.5418$ Å, a 2θ scanning range of from 20° to 80° s, and a scanning speed of 4°/min.

In the present application, the power compacted density of a material has a common meaning in the art and can be tested by the method known in this field. For example, the test could be implemented with reference to GB/T 24533-2009 using an electronic pressure testing machine (such as UTM7305) as follows: putting a certain amount of powder on a special mold for compaction, setting different pressure, reading the thickness of the powder on the apparatus under different pressure, and calculating the compacted density under different pressure. In the present application, the pressure is set to be 20,000N.

In the present application, the whole thickness of the negative electrode film layer can be measured with a ten-thousandth ruler (micrometer), for example, Mitutoyo293-100 with an accuracy of 0.1 μM.

In the present application, the respective thicknesses of the first negative electrode film layer and the second negative electrode film layer can be measured by using a scanning electron microscope (such as Zeiss sigma 300). The sample preparation is as follows: firstly, cutting the negative electrode into a certain size sample to be tested (e.g. 2 cm×2 cm), fixing the negative electrode sample on a sample station by paraffin. Then the sample station is placed onto the sample holder and well fixed. An argon cross-section polisher (such as IB-19500CP) is powered on and vacuumed (to e.g. $10^{-4}$Pa), various parameters such as argon flow (such as 0.15 MPa), voltage (such as 8 KV) and polishing period (such as 2 hours) are set, and the sample holder is adjusted to start polishing in a swing mode. For sample testing, reference can be made to JY/T 010-1996. To ensure the accuracy of the test results, several (for example, 10) different areas in the test sample may be randomly selected for scanning and testing, and at a certain magnification (for example, 500 times), the respective thickness of the first negative electrode film and the second negative electrode film are read in the measuring areas, and then the average value of the test results from the several test areas are taken as the average thickness of the first negative electrode film and the second negative electrode film, respectively.

In the present application, the surface density of the negative electrode film has a common meaning in this field and can be tested using methods known in this field. For example, a negative electrode plate subjected to a single-side coating and cold pressing is taken (if the negative electrode plate to be tested is subjected to a double-side coating, one side of the negative electrode film can be wiped off firstly), cut into small round disks with an area of S1, and the weight thereof is recorded as M1. Then the negative electrode film on the weighed negative electrode plate is wiped off and the negative electrode current collector is weighed again and the weight is recorded as M0. The surface density of the negative electrode film can be determined by the formula: (weight of negative electrode plate M1—weight of negative electrode current collector M0)/S1. To ensure the accuracy of the test result, multiple (such as 10) of test samples may be tested, and the average value is calculated as the test result.

It should be noted that the above-mentioned various parameter tests for the negative electrode active material can be performed by sampling and testing before coating, or can be performed by sampling and testing from the negative electrode film after cold pressing.

If the above test samples are taken from the negative electrode film after cold pressing, as an example, they can be sampled as follows:

(1) Firstly, a cold-pressed negative electrode film is randomly selected, and samples of the second negative electrode active material are taken by scraping powders (a blade can be used for sampling), wherein the depth of the powder scraping should not be more than the boundary between the first negative electrode film and the second negative electrode film;

(2) Secondly, samples of the first negative electrode active material are taken. Since there may be an inter-fusion layer between the first negative electrode film and the second negative electrode film during the cold pressing process (that is, the first active material and the second active material are both present in the inter-fusion layer), the inter-fusion layer can be scraped off first before sampling the first negative electrode active material, and then the first negative electrode active material is scraped to get the samples for the accuracy of the measurement; and (3) The samples of the first negative electrode active material and the second negative electrode active material as collected above are placed into deionized water respectively, subjected to suction filtration followed by drying, and then the dried negative electrode active materials are sintered at a certain temperature and time (for example, at 400° C. for 2 h) to remove the binder and conductive carbon, giving the test samples of the first negative electrode active material and the second negative electrode active material.

In the above sampling process, the boundary between the first negative electrode film and the second negative electrode film can be determined with the aid of an optical microscope or a scanning electron microscope.

The compacted density of negative electrode film has a common meaning in this field and can be tested by methods already known in this field. For example, the surface density and thickness of negative electrode film could be obtained according to the above test methods, and the compacted density of negative electrode film is equal to surface density of negative electrode film/thickness of negative electrode film.

Negative electrode active material used in the present application is commercially available.

In the secondary battery according to the present application, the negative electrode film can be arranged on either or both of the two opposite surfaces of the negative electrode current collector.

Figure 2:
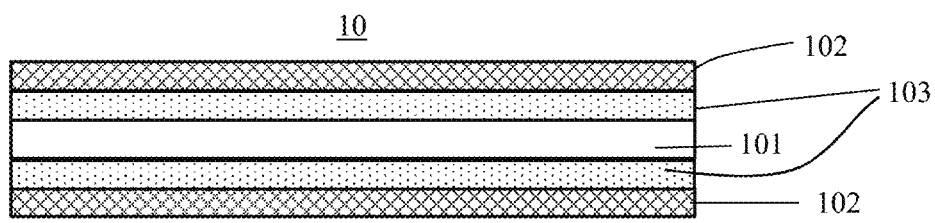
FIG. 2 shows a schematic diagram of an embodiment of a negative electrode plate of a secondary battery in the present application.

FIG. 2 shows the schematic diagram of an embodiment of the negative electrode plate 10 in the present application. The negative electrode plate 10 is composed of the negative electrode current collector 101, the first negative electrode films 103 arranged on the two surfaces of the negative electrode current collector, and the second negative electrode films 102 arranged on the first negative electrode films 103.

Figure 3:
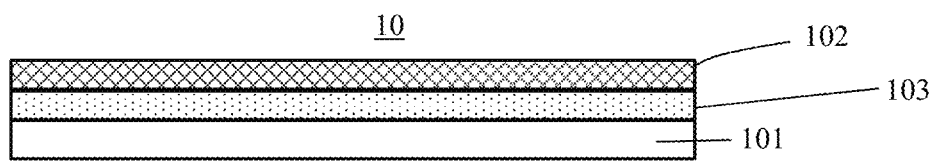
FIG. 3 shows a schematic diagram of another embodiment of a negative electrode plate of a secondary battery in the present application.

FIG. 3 shows the schematic diagram of another embodiment of the negative electrode plate 10 in the present application. The negative electrode plate 10 is composed of the negative electrode current collector 101, the first negative electrode film 103 arranged on one surface of the negative electrode current collector, and the second negative electrode film 102 arranged on the first negative electrode film 103.

It shall be noted that each negative electrode film parameter, such as thickness, area density, compacted density of the negative electrode film and so on, given in the present application refers to a parameter range of a single-side film. If the negative electrode films are located on both surfaces of the negative electrode current collector, and the film parameter on either surface satisfies requirements of the present application, it should be deemed to fall within the protection scope of the present application. The ranges of the film thickness, surface density and the like mentioned in the present application refer to the parameters of the film after cold pressing used for assembly of a battery.

In the secondary battery according to the present application, the negative electrode current collector may be a metal foil or a composite electrode current collector in which a metal material may be arranged on a polymer substrate to form the composite electrode current collector. As an example, the negative electrode current collector can be copper foil.

In the secondary battery of the present application, the first negative electrode film and/or the second negative electrode film generally contains a negative electrode active material, and an optional binder, an optional conductive agent, as well as other optional auxiliaries, and is generally formed by coating and drying a negative electrode film slurry. The negative electrode film slurry is generally formed by dispersing the negative electrode active material and optionally a conductive agent, a binder, and the like in a solvent, such as N-methylpyrrolidone (NMP) or deionized water, with stirring uniformly. Other optional auxiliaries may be, for example, thickening and dispersing agents (e.g. sodium carboxyl methylcellulose, CMC-Na), PTC thermistor materials, and the like.

As an example, the conductive agent may include one or more of the superconducting carbon, acetylene black, carbon black, Ketjen black, carbon dots, carbon nanotubes, graphene, and carbon nanofibers.

As an example, the binder may include one or more of the styrene-butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA) and polyvinyl butyral (PVB).

In the secondary battery of the present application, the first negative electrode active material and/or the second negative electrode active material may optionally include a certain amount of other common negative electrode active materials, such as one or more of soft carbon, hard carbon, silicon-based materials, tin-based materials, and lithium titanate, in addition to the specific negative electrode active material described above. The silicon-based material can be one or more selected from the elemental silicon, silicon-oxygen compound, silicon carbon complex and silicon alloy. The tin-based material can be one or more selected from elemental tin, tin oxygen compound, and tin alloys. Methods for preparing these materials are well known and these materials are commercially available. Technicians in this field can make appropriate choices based on the actual application environment.

In the secondary battery according to the present application, the negative electrode plate does not exclude other additional functional layers than the negative electrode film described above. For example, in some embodiments, the negative electrode plate described herein may further comprise a conductive layer (e.g., consisting of a conductive agent and a binder) disposed between the current collector and the first film. In some other embodiments, the negative electrode plate may further include a protective cover layer disposed on the surface of the second film.

[Positive Electrode Plate]

In the secondary battery of the present application, the positive electrode plate comprises a positive electrode current collector and a positive electrode film arranged on at least one surface of the positive electrode current collector and comprising a positive electrode active material.

It should be noted that the positive electrode current collector has two opposite surfaces in the direction of its thickness. The positive electrode film may be laminated on either or both of the two opposite surfaces of the positive electrode current collector.

In the secondary battery of the present application, the positive electrode current collector may be a metal foil or a composite electrode current collector in which a metal material can be arranged on a polymer substrate to form the composite electrode current collector. As an example, the positive electrode current collector maybe an aluminum foil.

In the secondary battery of the present application, the positive electrode active material may be a positive active material known in the art for secondary batteries. For example, the positive electrode active material may include one or more of lithium transition metal oxides, lithium phosphates of olivine structure and their respective modified compounds. Examples of lithium transition metal oxides may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and their modified compounds. Examples of lithium phosphates in olivine structures may include, but may not be limited to, one or more of lithium iron phosphate, a composite of lithium iron phosphate with carbon, lithium manganese phosphate, a composite of lithium manganese phosphate with carbon, lithium iron manganese phosphate, a composite of lithium iron manganese phosphate with carbon and their modified compounds. The present application is not limited to these materials, but may also adopt other conventional and common materials that can be used as positive electrode active materials for secondary batteries.

In some preferred embodiments, in order to further increase the energy density of the battery, the positive electrode active material may include one or more of a lithium transition metal oxide represented by formula 1 and the modified compounds thereof, $$Li_aNi_bCo_cM_dO_eA_f \qquad \text{Formula 1,}$$

in which, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S, and Cl.

In the present application, the modified compounds of above-mentioned materials may be compounds obtained by doping and/or surface coating of materials for modification.

In the secondary battery of the present application, the positive electrode film also optionally comprises a binder and a conductive agent.

As an example, the binder for the positive electrode film may include one or more of polyvinylidene fluoride (PVDF) and polytetrafluoroethylene (PTFE).

As an example, the conductive agent for the positive electrode film may include one or more of superconducting carbon, acetylene black, carbon black, Ketjen black, carbon dot, carbon nanotube, graphene and carbon nanofiber.

[Electrolyte]

Electrolytes act as conducting ions between positive and negative electrode plates. The present application has no specific limitation on the type of electrolyte, which may be selected according to requirements. For example, electrolytes may be at least one selected from solid and liquid electrolytes (i.e. electrolyte solution).

In some embodiments, the electrolyte is an electrolyte solution.

The electrolyte solution includes an electrolyte salt and a solvent. In some embodiments, the electrolyte salt can be one or more selected from $LiPF_6$ (Lithium Hexafluorophosphate), $LiBF_4$ (Lithium Tetrafluoroborate), $LiClO_4$ (Lithium Perchlorate), $LiAsF_6$ (Lithium Hexafluoroarsenate), LiFSI (Lithium Bisfluorosulfonimide), LiTFSI (Lithium Bis(trifluoromethanesulfonyl)imide), LiTFS (Lithium Trifluoromethanesulfonate), LiDFOB (Lithium Difluoro(oxalate)borate), LiBOB (Lithium Bis(oxalate)borate), $LiPO_2F_2$ (Lithium Difluorophosphate), LiDFOP (Lithium Difluorodioxalate phosphate) and LiTFOP (Lithium Tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluorinated ethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulphide (EMS), and ethyl sulfonyl ethanol (ESE).

In some embodiments, additives are also optionally included in the electrolyte solution. For example, additives may include negative electrode film forming additives, or positive electrode film forming additives, as well as additives that can improve some performances of batteries, such as additives that improve battery overcharge performance, additives that improve high-temperature performance, and additives that improve low-temperature performance.

[Separator]

Secondary batteries using electrolyte solutions, as well as some secondary batteries using solid-state electrolytes, also include a separator. The separator is arranged between the positive electrode plate and the negative electrode plate for isolation. The present application has no special limitation on the type of separator. Any common porous separator with good chemical and mechanical stability can be selected.

In some embodiments, the material of the separator may be one or more selected from glass fibers, non-woven fabrics, polyethylene, and polypropylene and polyvinylidene fluoride. The separator can be either a single-layer film or a multi-layer composite film. When the separator is a multi-layer composite film, the materials of each layer may be the same or different.

In some embodiments, an electrode assembly can be made by winding or laminating the positive electrode plate, negative electrode plate and separator.

In some embodiments, the secondary battery may include an external package. The external package can be used to encapsulate the electrode assembly and electrolyte.

In some embodiments, the external package of the secondary battery may be a hard shell, such as hard plastic shell, aluminum shell, and steel shell. The external package of the secondary battery can also be a soft pack, such as a bag-type soft pack. The soft pack may be made of plastics such as one or more of polypropylene (PP), polybutylene terephthalate (PBT), polybutylene succinate (PBS), and the like.

The present application has no special limitation on the shape of the secondary battery, which may be cylindrical, square or any other arbitrary shape. FIG. 1 shows a secondary battery 5 with a square-shaped structure as an example.

Figure 4:
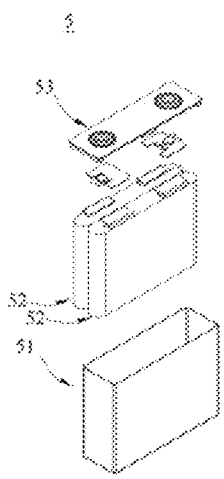
FIG. 4 shows a decomposition diagram of an embodiment of a secondary battery in the present application.

In some embodiments, the external package may include house 51 and cover plate 53, as shown in FIG. 4. House shell 51 may include the bottom plate and the side plate attached to the bottom plate. The bottom plate and the side plate are enclosed to form an accommodation chamber. House 51 has an opening communicating with the accommodation chamber, and cover plate 53 is used to cover the opening to close the accommodation chamber. The positive electrode plate, the negative electrode plate and the separator can form an electrode assembly 52 by winding or laminating process. The electrode assembly 52 is encapsulated in the accommodation chamber. The electrode assembly 52 is infiltrated by the electrolyte solution. The number of electrode assemblies 52 contained in the secondary battery 5 may be one or more, and may be adjusted according to requirements.

In some embodiments, the secondary batteries can be assembled into a battery module. The number of secondary batteries in the battery module can be more than one. The specific number can be adjusted according to the application and capacity of the battery module.

Figure 5:
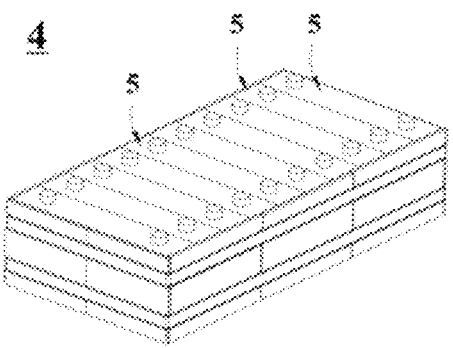
FIG. 5 shows a schematic diagram of an embodiment of a battery module.

FIG. 5 shows the battery module 4 as an example. With reference to FIG. 5, in the battery module 4, multiple secondary batteries 5 may be arranged in sequence along the length direction of battery module 4. Of course, it can also be arranged in any other ways. Further, the multiple secondary batteries 5 can be fixed by fasteners.

Optionally, the battery module 4 can also include a house with the accommodation space, in which multiple secondary batteries 5 are accommodated.

In some embodiments, the battery modules can also be assembled into a battery pack. The number of battery modules contained in the battery pack can be adjusted according to the application and capacity of the battery pack.

Figure 6:
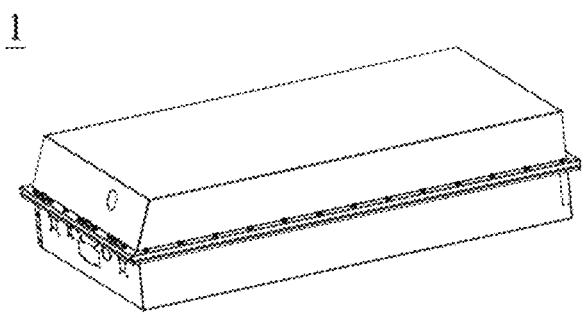
FIG. 6 shows a schematic diagram of an embodiment of a battery pack.
Figure 7:
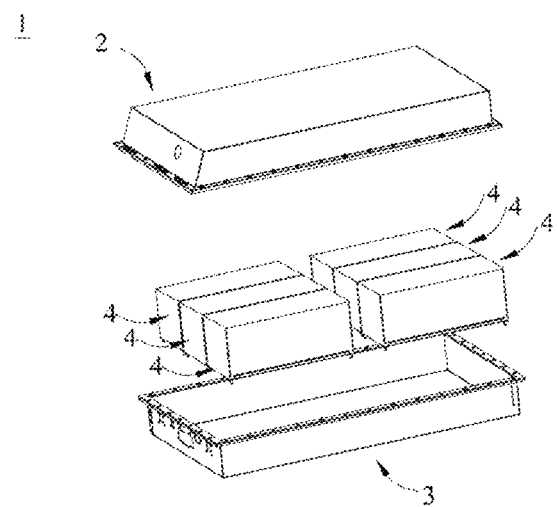
FIG. 7 is an exploded diagram of FIG. 6.

FIGS. 6 and 7 are of the battery pack 1 as an example. With reference to FIG. 6 and FIG. 7, the battery pack 1 may include a battery cabinet body and multiple battery modules 4 set in the battery cabinet body. The battery cabinet body comprises an upper cabinet body 2 and a lower cabinet body 3, wherein the upper cabinet body 2 is used to cover the lower cabinet body 3 and form a closed space for accommodating the battery module 4. Multiple battery modules 4 can be arranged in any way in the battery cabinet body.

Process for Preparing Secondary Batteries

In the second aspect of the present application, a process for preparing a secondary battery is provided, including preparing a negative electrode plate of the secondary battery by the following steps:

1) forming a first negative electrode film comprising a first negative electrode active material on at least one surface of a negative electrode current collector, wherein the first negative electrode active material comprises natural graphite; and 2) forming a second negative electrode film comprising a second negative electrode active material on the first negative electrode film, wherein the second negative electrode active material comprises artificial graphite; and the second negative electrode active material comprises secondary particles, and the number percentage of secondary particles in the second negative electrode active material S2 is greater than or equal to 20%.

In the process for preparing the secondary battery, the first negative electrode active material slurry and the second negative electrode active material slurry can be coated at the same time in one step, or can be coated separately.

In some preferred embodiments, the first negative electrode active material slurry and second negative electrode active material slurry are simultaneously coated at one time. The first and second negative electrode films can be better bonded by coating together in one step, which may further improve the cycle performance of the battery.

Except for the process for preparing the negative electrode plate of the present application, other configurations and preparation processes of the secondary battery according to the present application are known per se. For example, the positive plate of the present application can be prepared as follows: mixing an positive electrode active material, optional conductive agents (such as carbon materials for example carbon black) and binders (such as PVDF) and the like, dispersing the mixture into a solvent (such as NMP), uniformly stirring, coating the mixture on a positive current collector, and drying to obtain a positive plate. Material such as aluminum foil or porous metal plate can be used as a positive electrode current collector. When the positive plate is manufactured, a positive tab can be obtained in the uncoated area of the positive current collector through modes of punching or laser die cutting and the like.

Finally, the positive electrode plate, the separator and the negative electrode plate can be stacked, the separator between the positive and negative electrode plates works for isolation, and then the electrode assembly can be obtained by a winding or laminating process; the battery assembly is placed in an external package, into which the electrolyte solution is injected when it is dried. After that, the processes of vacuum packing, steady standing, formation, and shaping are carried out, thereby obtaining a secondary battery.

Apparatus

An apparatus is provided in the third aspect of the present application. The apparatus comprises a secondary battery according to the first aspect of the present application or comprises a secondary battery prepared by the process according to the second aspect of the present application. The secondary battery can be used as the power source of the apparatus or as the energy storage unit of the apparatus. The apparatus in the present application uses the secondary battery provided in the present application and thus has at least the same advantage as the secondary battery.

The apparatus can be, but is not limited to, a mobile apparatus (such as mobile phone, laptop, etc.) or an electric vehicle (such as pure electric vehicle, hybrid electric vehicle, plug-in hybrid electric vehicle, electric bicycle, electric scooter, electric golf cart, electric truck, etc.), electric train, ship and satellite, energy storage system, etc.

The apparatus may be a secondary battery, battery module or battery pack according to its application requirement.

Figure 8:
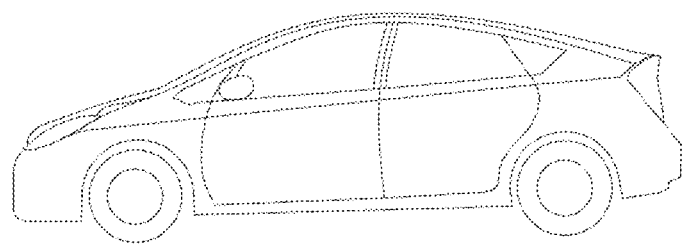
FIG. 8 shows a schematic diagram of an embodiment of an apparatus in the present application that applies the secondary battery as a power source.

FIG. 8 shows an apparatus as an example. The apparatus is may be pure electric vehicle, hybrid electric vehicle, or plug-in electric hybrid electric vehicle and so on. To meet the requirements of the apparatus for the high rate and high energy density of secondary batteries, the battery pack or battery module can be used.

The apparatus, as another example, may be mobile phone, tablet PC, laptop, and the like. The apparatus is usually required to be lightweight and can be powered by the secondary battery.

The beneficial effects of the present application are further described in combination with the examples as follows.

EXAMPLES

To make the invention purpose, technical solution and beneficial technical effects of the present application clearer, the present application is further described in combination with the following examples. However, it should be understood that the examples of the present application is intended only to explain the present application, but not to restrict the present application in any way, and that examples of the present application are not limited to the examples given in the specification. The test conditions or operating conditions not specified in the examples shall be made according to normal conditions or as recommended by the material supplier.

I. Preparation of Secondary Batteries

Example 1

1) Preparation of Positive Electrode Plate

Lithium nickel cobalt manganese ternary active material $LiNi_{0.8}Co_{0.1}Mn_{0.1}O_2$ (NCM 811), a conductive carbon black (Super-P) and a binder polyvinylidene fluoride (PVDF) in a weight ratio of 94:3:3 were mixed in an N-methylpyrrolidone solvent (NMP) and well stirred to be homogeneous, thereby giving a slurry. The slurry was coated on an aluminum foil current collector followed by drying, cold pressing, splitting, cutting and the like to give a positive electrode plate. The positive electrode film had a surface density of 19.0 $mg/cm^2$ and a compacted density of 3.4 $g/cm^3$.

2) Preparation of Negative Electrode Plate

Step one, preparing negative slurry 1: natural graphite as a first negative electrode active material, SBR as a binder, sodium carboxyl methylcellulose (CMC-Na) as a thickener and a conductive carbon black (Super-P) at a weight ratio of 96.2:1.8:1.2:0.8 together with deionized water were added to a stirring tank in a certain order for mixing to prepare the negative slurry 1;

Step two, preparing negative slurry 2: artificial graphite as a second negative electrode active material, SBR as a binder, sodium carboxyl methylcellulose (CMC-Na) as a thickener, and a conductive carbon black (Super-P) at a ratio of 96.2:1.8:1.2:0.8 together with deionized water were added to a stirring tank in a certain order for mixing to prepare negative slurry 2;

Step three, the negative slurry 1 and negative slurry 2 were extruded at the same time through a dual-cavity coating apparatus. The negative slurry 1 was coated on a current collector to form a first negative electrode film, and the negative slurry 2 was coated on the first negative electrode film to form a second negative electrode film, wherein the mass ratio of the first negative electrode film to the second negative electrode film was 1:1, and the whole negative electrode film had had a surface density of 12 mg/cm$^2$ and a compacted density of 1.67 g/cm$^3$. Surface density of the negative electrode film is 11.0 mg/cm$^2$; and Step four, the wet film formed through coating was baked through an oven at different temperature areas to form a dried plate, which was subjected to cold pressing to form the desired negative electrode film. After that, striping, cutting and the like were performed to give a negative electrode plate.

3) Separator

PE film was selected as separator.

4) Preparation of Electrolyte Solution

Ethylene carbonate (EC), methyl ethyl carbonate (EMC) and diethyl carbonate (DEC) were mixed according to a volume ratio of 1:1:1. Then a fully dried lithium salt LiPF$_6$ was dissolved into the mixed organic solvent at the ratio of 1 mol/L to prepare an electrolyte solution.

5) Preparation of Battery

The positive plate, the separator and the negative electrode plate described as above were sequentially stacked, with a reference electrode incorporated between the separator and the negative electrode plate wherein the reference electrode could be used for the subsequent detection of the performance of the battery sample and be selected from a lithium plate, a lithium metal wire and the like, and the reference electrode should be separated by the separator from contacting with either of the positive electrode and negative electrode, and the stack was wound into an electrode assembly. The electrode assembly was packed into an outer package into which the electrolyte was added, followed by packaging, standing, formation, aging and the like, thereby obtaining a secondary battery.

The preparation processes of secondary batteries of Examples 2 to 21 and Comparative Examples 1 to 4 were similar to those of Example 1, with the exception that the composition of negative electrode plate and product parameters were adjusted. The different product parameters for different examples are shown in Table 1 and Table 2.

II. Test Methods for Battery Performance

1. Quick Charging Performance Test

At 25° C., the secondary batteries prepared in the above examples and comparative examples were charged and discharged for the first time at a current of 1 C (i.e., the current value at which the theoretical capacity is completely discharged within 1 h), including: constant-current charging the battery to a charging cut-off voltage V1 at a rate of 1 C, then constant-voltage charging the battery to a current ≥0.05 C, standing for 5 min, and then constant-current discharging the battery to a discharging cut-off voltage V2 at a rate of 0.33 C, and recording its actual capacity as $C_0$.

Then, constant-current charging of the battery was carried out to arrive at a full-cell charging cut-off voltage V1 or 0V negative cut-off potential whichever comes first by using $2.8C_0$, $3.0C_0$, $3.2C_0$, $3.5C_0$, $3.8C_0$, $4.1C_0$, $4.4C_0$, $4.7C_0$, $5.0C_0$, $5.3C_0$, $5.6C_0$ and $5.9C_0$ in sequence. After each charging was completed, the battery was required to be discharged to a full battery discharge cut-off voltage V2 at $1.0C_0$, and the negative potentials when the battery was charged to 10%, 20%, 30%, . . . and 80% SOC (State of Charge) under different charging rates were recorded, which were plotted as a curve of charging rate-negative potential under different SOC states. By linear fitting, the charging rates when the negative potential was 0V under different SOC states were obtained, the charging rates were a charging window under the SOC State recorded as $C_{10\%\ SOC}$, $C_{20\%\ SOC}$, $C_{30\%\ SOC}$, $C_{40\%\ SOC}$, $C_{50\%\ SOC}$, $C_{60\%\ SOC}$, $C_{70\%\ SOC}$, $C_{80\%\ SOC}$, and the charging time T in min of the battery from 10% SOC to 80% SOC was calculated based on the following formula $(60/C_{20\%\ SOC}+60/C_{30\%\ SOC}+60/C_{40\%\ SOC}+60/C_{50\%\ SOC}+60/C_{60\%\ SOC}+60/C_{70\%\ SOC}+60/C_{80\%\ SOC})\times10\%$. The shorter the time T, the more excellent the quick charging performance of the battery is.

2. Cycle Performance Test

The cycle performance of the secondary batteries prepared in the above examples and comparative examples were tested by subjecting the batteries to full-charging and full-discharging cycles, in which each battery was charged according to the charging strategy designed for the above maximum charging time T and discharged at a current of 1 C at 25° C. until the capacity of the battery was attenuated to 80% of the initial capacity, and the number of cycles was recorded.

3. High Temperature Storage Performance Test

At 25° C., each of the secondary batteries prepared in the above examples and comparative examples was charged to a charging cut-off voltage V1 at a current of 1 C, then charged at the constant-voltage to a current of 0.05 C, left standing for 5 min, and then subjected to a constant-current discharging to a discharging cut-off voltage V2 at a current of 0.33 C, and the initial discharge capacity of the battery was recorded. Then, at 25° C., the secondary battery was charged to a charging cut-off voltage V1 at a current of 1 C, and then charged at the constant-voltage to a current of 0.05 C, when the battery was fully charged, and the fully-charged battery was stored in a thermostat at 60° C. The battery was taken out of the thermostat once every week, discharged to a discharging cut-off voltage V2 at a current of 0.33 C, left standing for 5 min, charged to the charging cut-off voltage V1 at a current of 1 C, then charged at the constant-voltage to a current of 0.05 C, left standing for 5 min, and then subjected to a constant-current discharging at a current of 0.33 C, and the discharge capacity of the battery was recorded. When the capacity was attenuated to 80% of the initial discharge capacity, the number of days stored was recorded. (It should be noted that each time after the battery was taken out and tested, the battery should be charged to the charging cut-off voltage V1 at a current of 1 C, and then charged at the constant-voltage to a current of 0.05 C to keep the battery at the fully-charged state before it was stored in the thermostat at 60° C.)

III. Test Results for Each Example and Comparative Example

In accordance with the above methods, the batteries of the examples and comparative examples were prepared, and tested for various performance parameters. The results are shown in Table 1 and Table 2 as below.

TABLE 1

| No. | Type and mass ratio of the first negative electrode active material | Proportion of Primary particles in the first negative electrode active material S1 | Type and mass ratio of the second negative electrode active material |
|---|---|---|---|
| Ex. 1 | 100% Natural graphite | 95% | 100% Artificial graphite |
| Ex. 2 | 100% Natural graphite | 95% | 100% Artificial graphite |
| Ex. 3 | 100% Natural graphite | 95% | 100% Artificial graphite |
| Ex. 4 | 100% Natural graphite | 95% | 100% Artificial graphite |
| Ex. 5 | 100% Natural graphite | 95% | 100% Artificial graphite |
| Ex. 6 | 100% Natural graphite | 95% | 100% Artificial graphite |
| Ex. 7 | 100% Natural graphite | 95% | 100% Artificial graphite |
| Ex. 8 | 60% Natural graphite + 40% Artificial graphite | 65% | 100% Artificial graphite |
| Ex. 9 | 60% Natural graphite + 40% Artificial graphite | 75% | 100% Artificial graphite |
| Ex. 10 | 80% Natural graphite + 20% Artificial graphite | 83% | 100% Artificial graphite |
| Ex. 11 | 80% Natural graphite + 20% Artificial graphite | 90% | 100% Artificial graphite |
| Comp. Ex. 1 | 100% Natural graphite | 95% | 100% Artificial graphite |
| Comp. Ex. 2 | 60% Natural graphite + 40% Artificial graphite | 95% | 100% Artificial graphite |
| Comp. Ex. 3 | 80% Natural graphite + 20% Artificial graphite | 95% | 100% Artificial graphite |

| No. | Proportion of secondary particles in the second negative electrode active material S2 | Quick charging performance (min) | Cycle performance (quick charging cycle) | Storage performance at 60° C. (days) |
|---|---|---|---|---|
| Ex. 1 | 25% | 50 | 1280 | 515 |
| Ex. 2 | 35% | 45 | 1350 | 505 |
| Ex. 3 | 50% | 32 | 1400 | 445 |
| Ex. 4 | 60% | 28 | 1560 | 450 |
| Ex. 5 | 85% | 26 | 1650 | 440 |
| Ex. 6 | 93% | 20 | 1700 | 405 |
| Ex. 7 | 95% | 19 | 1750 | 402 |
| Ex. 8 | 85% | 45 | 1320 | 480 |
| Ex. 9 | 85% | 39 | 1440 | 485 |
| Ex. 10 | 85% | 34 | 1450 | 505 |
| Ex. 11 | 85% | 31 | 1520 | 510 |
| Comp. Ex. 1 | 5% | 94 | 620 | 535 |
| Comp. Ex. 2 | 5% | 120 | 440 | 530 |
| Comp. Ex. 3 | 5% | 108 | 510 | 540 |

TABLE 2

| No. | Type and mass ratio of the first negative electrode active material | Proportion of Primary particles in the first negative electrode active material S1 | DV50 of the first negative electrode active material | Type and mass ratio of the second negative electrode active material | Proportion of secondary particles in the second negative electrode active material S2 |
|---|---|---|---|---|---|
| Ex. 8 | 100% Natural graphite | 95% | 8.0 | 100% Artificial graphite | 85% |
| Ex. 9 | 100% Natural graphite | 95% | 11.0 | 100% Artificial graphite | 85% |
| Ex. 10 | 100% Natural graphite | 95% | 13.0 | 100% Artificial graphite | 85% |
| Ex. 11 | 100% Natural graphite | 95% | 15.5 | 100% Artificial graphite | 85% |
| Ex. 12 | 100% Natural graphite | 95% | 17.0 | 100% Artificial graphite | 85% |
| Ex. 13 | 100% Natural graphite | 95% | 18.0 | 100% Artificial graphite | 85% |
| Ex. 14 | 100% Natural graphite | 95% | 20.0 | 100% Artificial graphite | 85% |
| Ex. 15 | 100% Natural graphite | 95% | 15.5 | 100% Artificial graphite | 85% |
| Ex. 16 | 100% Natural graphite | 95% | 15.5 | 100% Artificial graphite | 85% |
| Ex. 17 | 100% Natural graphite | 95% | 15.5 | 100% Artificial graphite | 85% |
| Ex. 18 | 100% Natural graphite | 95% | 15.5 | 100% Artificial graphite | 85% |
| Ex. 19 | 100% Natural graphite | 95% | 15.5 | 100% Artificial graphite | 85% |
| Ex. 20 | 100% Natural graphite | 95% | 15.5 | 100% Artificial graphite | 85% |
| Ex. 21 | 100% Natural graphite | 95% | 15.5 | 100% Artificial graphite | 85% |

| No. | DV50 of the second negative electrode active material | Quick charging performance (min) | Cycle performance (quick charging cycle) | Storage performance at 60° C. (days) |
|---|---|---|---|---|
| Ex. 8 | 13.20 | 38 | 1320 | 450 |
| Ex. 9 | 13.20 | 36 | 1360 | 500 |
| Ex. 10 | 13.20 | 34 | 1380 | 480 |
| Ex. 11 | 13.20 | 27 | 1480 | 510 |
| Ex. 12 | 13.20 | 26 | 1650 | 520 |
| Ex. 13 | 13.20 | 22 | 1680 | 440 |
| Ex. 14 | 13.20 | 20 | 1720 | 450 |
| Ex. 15 | 9.00 | 19 | 1580 | 450 |
| Ex. 16 | 11.00 | 20 | 1420 | 445 |
| Ex. 17 | 13.20 | 24 | 1480 | 460 |

TABLE 2-continued

| Ex. 18 | 14.90 | 28 | 1420 | 470 |
| Ex. 19 | 16.00 | 32 | 1350 | 480 |
| Ex. 20 | 18.00 | 40 | 1320 | 500 |
| Ex. 21 | 20.00 | 42 | 1260 | 525 |

It can be seen from the comparison between examples 1-7 and comparative examples 1-4 that in case the negative film layer has a dual coating structure, the negative electrode active material at the lower layer includes natural graphite and the negative electrode active material at the upper layer includes artificial graphite, only when the second negative electrode active material includes secondary particles and the number percentage of the secondary particles in the second negative electrode active material S2 is ≥20%, the battery can have good quick charging performance and long cycle life at the same time. Preferably, S2 is ≥50%.

It can be seen from the comparison of examples 8-21 that when the negative film layer has a dual coating structure, the negative electrode active material at the lower layer includes natural graphite and the negative electrode active material at the upper layer includes artificial graphite and S2 falls within the preferred range, the volume distribution particle size Dv50 of negative electrode active material at each layer has a great impact on the battery performance. When the particle size Dv50 of the first negative electrode active material is greater than the particle size Dv50 of the second negative electrode active material, the battery can have good quick charging performance and good cycle performance at the same time.

It should also be supplemented that according to the disclosure and guidance of the above-mentioned specifications, those skilled in the art may also make appropriate changes and modifications to the above-mentioned examples. Therefore, the present application is not limited to the specific examples disclosed and described above, and some modifications and changes to the present application fall within the scope of protection of the claims of the present application. In addition, although a number of specific terms are used in this specification, these terms are intended for convenience only and do not constitute any restriction on the present application.

What is claimed is:

1. A secondary battery, comprising a negative electrode plate, wherein the negative electrode plate comprises a negative electrode current collector and a negative electrode film, and the negative electrode film comprises a first negative electrode film and a second negative electrode film;
   the first negative electrode film is disposed on at least one surface of the negative electrode current collector and comprises a first negative electrode active material, and the first negative electrode active material comprises natural graphite; and
   the second negative electrode film is disposed on the first negative electrode film and comprises a second negative electrode active material, the second negative electrode active material comprises artificial graphite, and the second negative electrode active material comprises secondary particles and the number percentage of secondary particles in the second negative electrode active material S2 is greater than or equal to 20%;
   wherein the volume distribution particle size $D_v50$ of the first negative electrode active material is greater than the volume distribution particle size $D_v50$ of the second negative electrode active material; the first negative electrode active material has a volume distribution particle size $D_v50$ of from 11 μm to 20 μm; and the second negative electrode active material has a volume distribution particle size $D_v50$ of from 11 μm to 18 μm.

2. The secondary battery according to claim 1, wherein the number percentage of secondary particles in the second negative electrode active material S2 is greater than or equal to 50%.

3. The secondary battery according to claim 1, wherein first negative electrode active material comprises primary particles, and the number percentage of primary particles in the first negative electrode active material S1 is greater than or equal to 80%.

4. The secondary battery according to claim 1, wherein the mass percentage of the natural graphite in the first negative electrode active material is ≥60%.

5. The secondary battery according to claim 1, wherein the mass percentage of the artificial graphite in the second negative electrode active material is ≥90%.

6. The secondary battery according to claim 1, wherein the ratio of the compacted density of the first negative electrode active material under 20,000 N pressure to the compacted density of the second negative electrode active material under 20,000 N pressure is ≥0.78.

7. The secondary battery according to claim 1, wherein the first negative electrode active material further satisfies one or more of the following (1)-(5):
   (1) the first negative electrode active material has a volume distribution particle size $D_v10$ of from 6 μm to 11 μm;
   (2) the first negative electrode active material has a volume distribution particle size $D_v99$ of from 24 μm to 38 μm;
   (3) the first negative electrode active material has a particle size distribution $(D_v90-D_v10)/D_v50$ of from 0.7 to 1.5;
   (4) the first negative electrode active material has a compacted density of from 1.6 g/cm³ to 1.88 g/cm³ at a pressure of 20,000 N; and
   (5) the graphitization degree of the first negative electrode active material is ≥95.5%.

8. The secondary battery according to claim 2, wherein the first negative electrode active material further satisfies one or more of the following (1)-(5):
   (1) the first negative electrode active material has a volume distribution particle size $D_v10$ of from 6 μm to 11 μm;
   (2) the first negative electrode active material has a volume distribution particle size $D_v99$ of from 24 μm to 38 μm;
   (3) the first negative electrode active material has a particle size distribution $(D_v90-D_v10)/D_v50$ of from 0.7 to 1.5;
   (4) the first negative electrode active material has a compacted density of from 1.6 g/cm³ to 1.88 g/cm³ at a pressure of 20,000 N; and
   (5) the graphitization degree of the first negative electrode active material is ≥95.5%.

9. The secondary battery according to claim 3, wherein the first negative electrode active material further satisfies one or more of the following (1)-(5):
   (1) the first negative electrode active material has a volume distribution particle size $D_V10$ of from 6 μm to 11 μm;
   (2) the first negative electrode active material has a volume distribution particle size $D_V99$ of from 24 μm to 38 μm;
   (3) the first negative electrode active material has a particle size distribution $(D_V90-D_V10)/D_V50$ of from 0.7 to 1.5;
   (4) the first negative electrode active material has a compacted density of from 1.6 g/cm³ to 1.88 g/cm³ at a pressure of 20,000 N; and
   (5) the graphitization degree of the first negative electrode active material is ≥95.5%.

10. The secondary battery according to claim 4, wherein the first negative electrode active material further satisfies one or more of the following (1)-(5):
   (1) the first negative electrode active material has a volume distribution particle size $D_V10$ of from 6 μm to 11 μm;
   (2) the first negative electrode active material has a volume distribution particle size $D_V99$ of from 24 μm to 38 μm;
   (3) the first negative electrode active material has a particle size distribution $(D_V90-D_V10)/D_V50$ of from 0.7 to 1.5;
   (4) the first negative electrode active material has a compacted density of from 1.6 g/cm³ to 1.88 g/cm³ at a pressure of 20,000 N; and
   (5) the graphitization degree of the first negative electrode active material is ≥95.5%.

11. The secondary battery according to claim 1, wherein the second negative electrode active material further satisfies one or more of the following (1)-(5):
   (1) the second negative electrode active material has a volume distribution particle size $D_V10$ of from 6.2 μm to 9.2 μm;
   (2) the second negative electrode active material has a volume distribution particle size $D_V99$ of from 29 μm to 43 μm;
   (3) the second negative electrode active material has a particle size distribution $(D_V90-D_V10)/D_V50$ of from 0.9 to 1.6;
   (4) the second negative electrode active material has a compacted density of from 1.58 g/cm³ to 1.82 g/cm³ at a pressure of 20,000 N; and
   (5) the graphitization degree of the second negative electrode active material is from 92.5% to 96.5%.

12. The secondary battery according to claim 2, wherein the second negative electrode active material further satisfies one or more of the following (1)-(5):
   (1) the second negative electrode active material has a volume distribution particle size $D_V10$ of from 6.2 μm to 9.2 μm;
   (2) the second negative electrode active material has a volume distribution particle size $D_V99$ of from 29 μm to 43 μm;
   (3) the second negative electrode active material has a particle size distribution $(D_V90-D_V10)/D_V50$ of from 0.9 to 1.6;
   (4) the second negative electrode active material has a compacted density of from 1.58 g/cm³ to 1.82 g/cm³ at a pressure of 20,000 N; and
   (5) the graphitization degree of the second negative electrode active material is from 92.5% to 96.5%.

13. The secondary battery according to claim 3, wherein the second negative electrode active material further satisfies one or more of the following (1)-(5):
   (1) the second negative electrode active material has a volume distribution particle size $D_V10$ of from 6.2 μm to 9.2 μm;
   (2) the second negative electrode active material has a volume distribution particle size $D_V99$ of from 29 μm to 43 μm;
   (3) the second negative electrode active material has a particle size distribution $(D_V90-D_V10)/D_V50$ of from 0.9 to 1.6;
   (4) the second negative electrode active material has a compacted density of from 1.58 g/cm³ to 1.82 g/cm³ at a pressure of 20,000 N; and
   (5) the graphitization degree of the second negative electrode active material is from 92.5% to 96.5%.

14. The secondary battery according to claim 4, wherein the second negative electrode active material further satisfies one or more of the following (1)-(5):
   (1) the second negative electrode active material has a volume distribution particle size $D_V10$ of from 6.2 μm to 9.2 μm;
   (2) the second negative electrode active material has a volume distribution particle size $D_V99$ of from 29 μm to 43 μm;
   (3) the second negative electrode active material has a particle size distribution $(D_V90-D_V10)/D_V50$ of from 0.9 to 1.6;
   (4) the second negative electrode active material has a compacted density of from 1.58 g/cm³ to 1.82 g/cm³ at a pressure of 20,000 N; and
   (5) the graphitization degree of the second negative electrode active material is from 92.5% to 96.5%.

15. The secondary battery according to claim 1, wherein the secondary battery comprises a positive electrode plate, wherein the positive electrode plate comprises a positive electrode current collector and a positive electrode film disposed on at least one surface of the positive electrode current collector and comprising a positive electrode active material, wherein positive electrode active material comprises one or more of lithium transition metal oxides, lithium phosphates of olivine structure and their respective modified compounds.

16. A process for preparing a secondary battery, comprising preparing a negative electrode plate of the secondary battery by the following steps:
   1) forming a first negative electrode film comprising a first negative electrode active material on at least one surface of a negative electrode current collector, wherein the first negative electrode active material comprises natural graphite; and
   2) forming a second negative electrode film comprising a second negative electrode active material on the first negative electrode film, wherein the second negative electrode active material comprises artificial graphite; and the second negative electrode active material comprises secondary particles, and the number percentage of secondary particles in the second negative electrode active material S2 is greater than or equal to 20%;
   wherein the volume distribution particle size $D_V50$ of the first negative electrode active material is greater than the volume distribution particle size $D_V50$ of the second negative electrode active material; the first negative electrode active material has a volume distribution particle size $D_V50$ of from 11 μm to 20 μm; and the second negative electrode active material has a volume distribution particle size $D_V50$ of from 11 μm to 18 μm.

17. The process for preparing a secondary battery according to claim 16, wherein the first negative electrode film and the second negative electrode film are formed by simultaneous coating.

18. An apparatus, comprising the secondary battery according to claim 1.

19. The secondary battery according to claim 1, wherein the positive electrode active material comprises one or more of a lithium transition metal oxide represented by formula 1 and the modified compounds thereof, $$Li_aNi_bCo_cM_dO_eA_f \qquad \text{Formula 1,}$$

in which, $0.8 \le a \le 1.2$, $0.5 \le b < 1$, $0 < c < 1$, $0 < d < 1$, $1 \le e \le 2$, $0 \le f \le 1$, M is one or more selected from Mn, Al, Zr, Zn, Cu, Cr, Mg, Fe, V, Ti and B, and A is one or more selected from N, F, S, and Cl.

* * * * *